United States Patent

Venkatesh et al.

[11] Patent Number: 6,066,257
[45] Date of Patent: May 23, 2000

[54] PROCESS FOR THE REMOVAL AND DESTRUCTION OF PERCHLORATE AND NITRATE FROM AQUEOUS STREAMS

[75] Inventors: K. Raman Venkatesh; Eve R. Cobes, both of Pittsburgh, Pa.; Dale Lee Jennings, Lakeland, Fla.; Norman J. Wagner, Pittsburgh, Pa.

[73] Assignee: Calgon Carbon Corporation, Pittsburgh, Pa.

[21] Appl. No.: 09/128,569

[22] Filed: Aug. 4, 1998

[51] Int. Cl.[7] .................................. C02F 1/58; C02F 3/04
[52] U.S. Cl. .......................... 210/615; 210/630; 210/631; 210/669; 210/748; 210/763; 210/903
[58] Field of Search .................... 210/605, 610, 210/611, 612, 615–617, 631, 630, 668, 669, 673–678, 683–686, 748, 763, 903

[56] References Cited

U.S. PATENT DOCUMENTS

| | | | |
|---|---|---|---|
| 3,943,055 | 3/1976 | Korenkov et al. | 210/611 |
| 5,302,285 | 4/1994 | Attaway et al. | 210/611 |
| 5,409,617 | 4/1995 | Ross et al. | 210/763 |
| 5,552,325 | 9/1996 | Nochumson et al. | 210/660 |
| 5,792,336 | 8/1998 | Nikolaevsky et al. | 210/763 |
| 5,811,255 | 9/1998 | Hanter et al. | 210/614 |

*Primary Examiner*—Thomas G. Wyse
*Attorney, Agent, or Firm*—Cohen & Grigsby, P.C.

[57] ABSTRACT

A process for concentrating and destroying the perchlorate and nitrate anions present in ground water and drinking water sources is disclosed. In the process, the perchlorate and nitrate anions present in feed water are concentrated into a much smaller effluent stream. A typical process configuration involves using a continuous contacter apparatus known as ISEP wherein the perchlorate present in feed water is adsorbed on to an ion-exchange resin resulting in a perchlorate-free treated water. The ISEP unit also incorporates a regeneration zone where the adsorbed perchlorate is effectively removed from the resin using relatively low volumes of concentrated brine solution as the regenerant. The waste from the ISEP unit is a concentrated brine solution containing perchlorate and other anions that may be present in the feed stream. This waste stream from the ISEP unit is treated by a combination of: i) bioreactor or a catalytic reactor that removes perchlorate and nitrate (if present) anions ii) sulfate removal (if needed) by nanofiltration or other established methods and iii) filters and a disinfectant system to render the brine stream re-usable. The resulting stream is recycled back into the process. The entire process results in a very small waste stream that needs disposal. The process can be applied to feed water streams containing either perchlorate alone or perchlorate and other anions such as nitrate, sulfate and bicarbonate.

14 Claims, 3 Drawing Sheets

Perchlorate Removal Total Process Design
PROPRIETARY AND CONFIDENTIAL

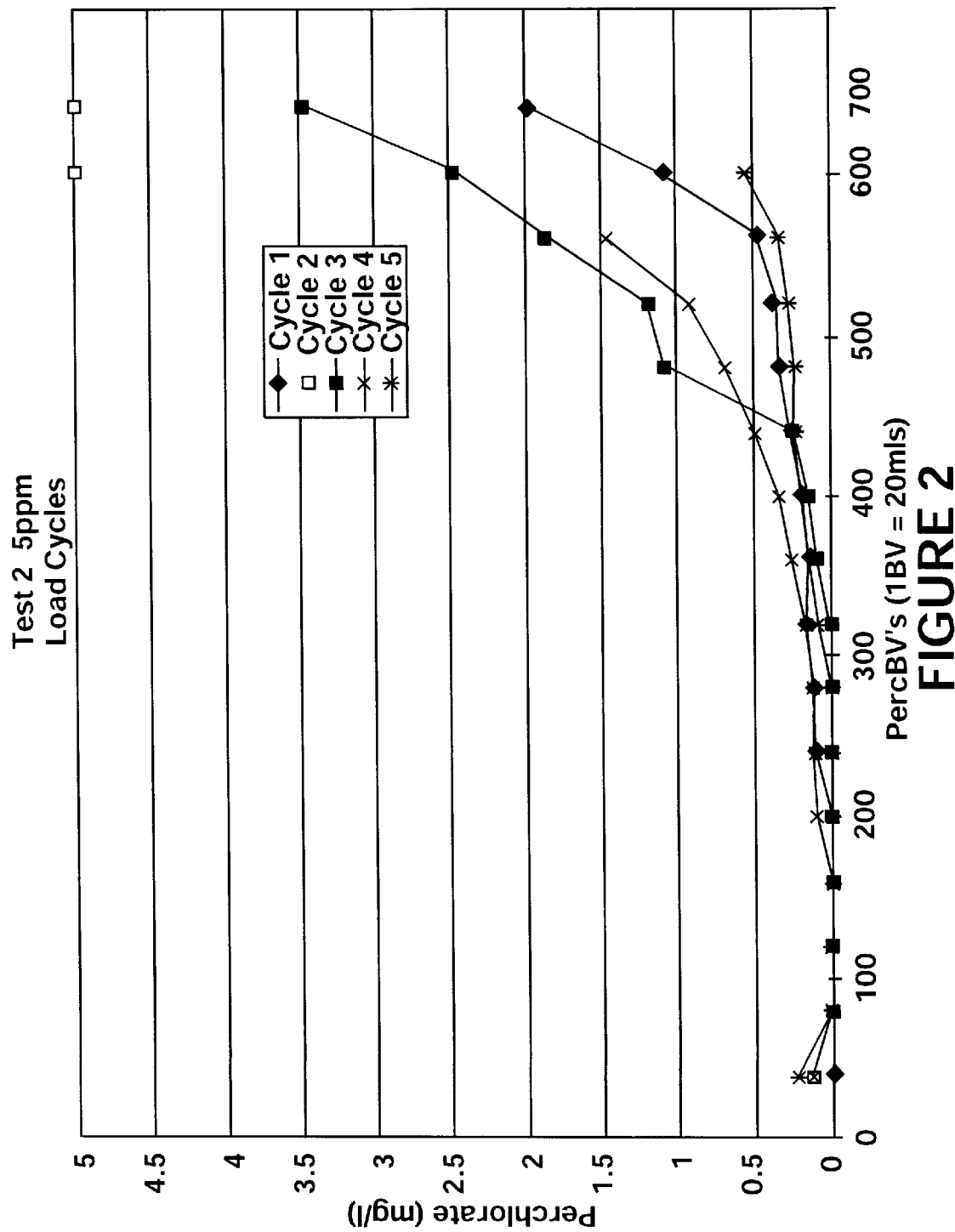

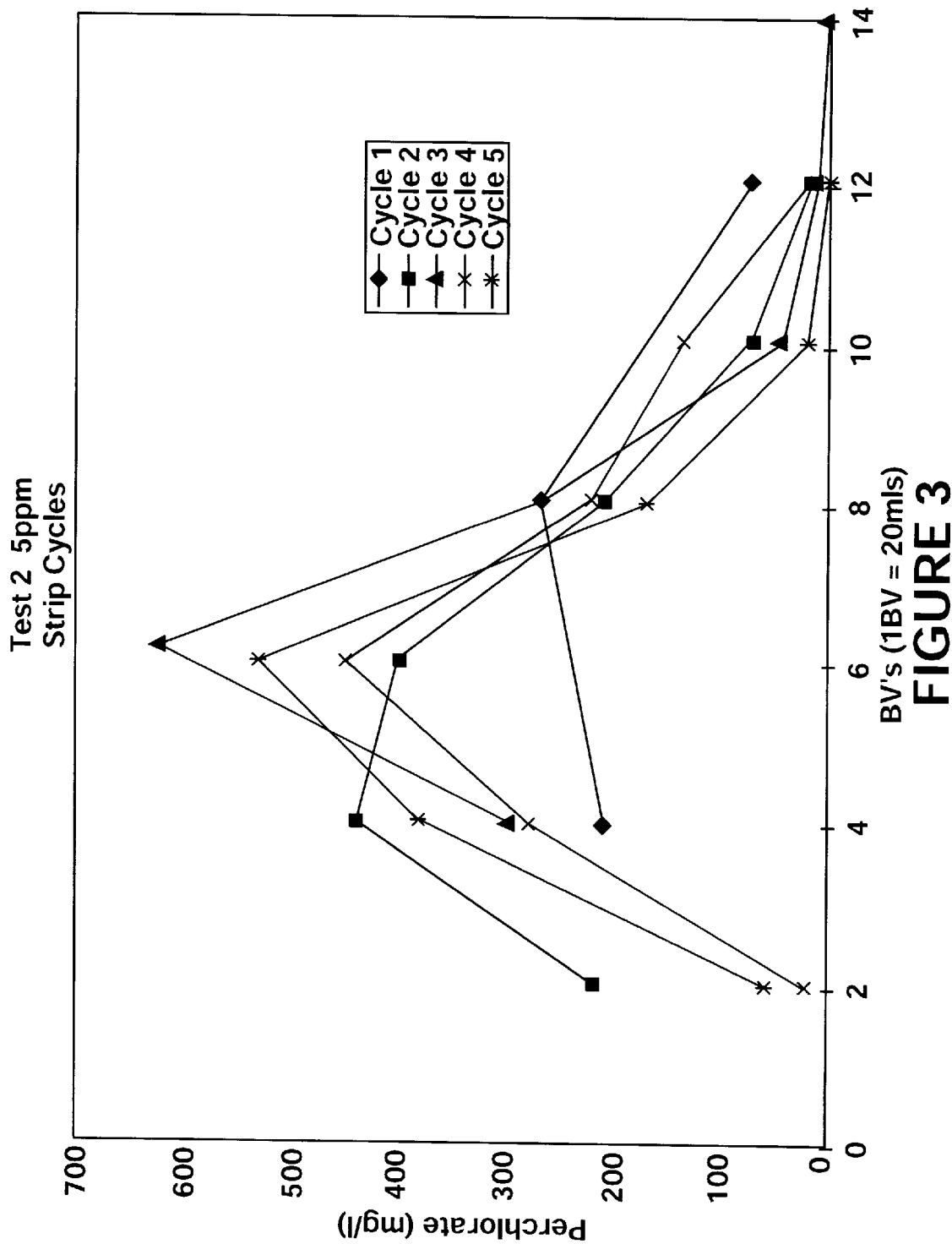

6,066,257

PROCESS FOR THE REMOVAL AND DESTRUCTION OF PERCHLORATE AND NITRATE FROM AQUEOUS STREAMS

FIELD OF THE INVENTION

The present invention relates to a process for the removal of perchlorate and nitrate from aqueous streams and, in particular, to a process using a continuous contact apparatus wherein the perchlorate present in feed water is adsorbed on to an ion-exchange resin resulting in a perchlorate-free treated water and the perchlorate and nitrates present on the resin are concentrated into a brine which is further treated.

BACKGROUND OF THE INVENTION

Perchlorate ($ClO_4^-$) and nitrate ($NO_3^-$) anions present in drinking water sources present a serious health hazard to the general public. The perchlorate anions are a result of dissolved perchlorate salts, such as ammonium perchlorate ($NH_4ClO_4$), used in the manufacture and reclamation of explosives and solid rocket propellants. Since many perchlorate salts have high solubility in water, the ground water in the vicinity of sites where perchlorate was used is likely to be contaminated with the perchlorate anion. The concentration of dissolved perchlorate in ground water in the vicinity of such sites depends on a number of factors, some of which include the extent of ground contamination, distance from contamination site and access to immediate water table. Typical concentrations of dissolved perchlorate in ground water range from 20–600 parts-per-billion (ppb) near the contaminated areas. While the nitrate issue was identified earlier, the perchlorate problem has only been recently identified in southern California and parts of Nevada in the United States.

The first regulatory action has appeared in California where an interim action limit of 18 ppb of perchlorate in ground water has been established and other states may soon follow. As results of further studies assessing the impact of perchlorate on public health become available, it is possible that the regulatory limit on perchlorate contamination in drinking water may be set at a more stringent level.

There are two general methods for the removal of perchlorate from water. In the first, the contaminated water is treated directly by a bioreactor in which microbes convert the perchlorate into an innocuous form. A prior art method discloses that the introduction of the contaminated feed stream is directly into a reactor containing a mixed bacterial culture called HAP1 that reduces the perchlorate to chloride in the presence of a nutrient. Typically, such prior art anaerobic bioreactions require very high residence times for reasonable perchlorate destruction, often exceeding 40 hours. In many municipal drinking water applications, the feed water flow rates can range from 500–1,000,000 gallons per minute (gpm). Where the residence time exceeds 40 hours, the anaerobic bioreaction requires practically infeasible reactor sizes (e.g. 1.2–2,400 million gallons) and economically prohibitive amounts of nutrient. In fact, the practical viability of this approach is in doubt for typical municipal feed water flow rates even at residence times as low as 30 minutes at comparatively low perchlorate feed concentrations (<100 ppb). It is, therefore, evident that this method is not feasible for removing perchlorate from most of the municipal ground water treatment applications.

Another approach is the use of a chemical salt to react with the dissolved perchlorate to form a perchlorate salt, which is removed by precipitation. Normally, the prior art teaches the use of adding potassium chloride to water to form potassium perchlorate that is precipitated. This approach is feasible where the perchlorate concentration is relatively high (>100 parts-per-million or ppm) and where removal of most, but not all, of the dissolved perchlorate is acceptable. However, it is unlikely to be useful for ground water treatment applications where the perchlorate concentrations are relatively low because the water-solubility (about 1 part in 65 parts water) of potassium perchlorate is high enough to prevent potassium perchlorate to be completely removed from ground water containing less than 1 ppm (1000 ppb) perchlorate.

Accordingly, it is an object of the present invention to provide a method for efficiently and effectively reducing the perchlorate from ground water to non-detectable levels rendering it safe for public consumption. It is a further object of the present invention to provide a method for reducing perchlorate from ground water that is both effective and economical to practice and is useful in municipal drinking water where there is both high and low concentrations.

SUMMARY OF THE INVENTION

The present invention provides a method for the removal and destruction of perchlorate and nitrate in ground water and other possible drinking water sources. In the process of the present invention, the perchlorate-containing stream is passed through an apparatus that serves as a continuous countercurrent contacter (referred to hereinafter as an "ISEP"). If some organic contaminants are also present in the water stream, the feed water may be passed through an activated carbon bed or a suitable organic-adsorbent bed to remove such organics either prior to or after the ISEP.

Normally, the ISEP unit (for example ISEP or CSEP systems, manufactured by Advanced Separation Technologies, Inc.) contains multiple rotating columns attached to a patented valve. Each of the columns is packed with a suitable anion-exchange resin, typically in the chloride form. The ISEP columns are preferably divided into three functional zones, viz., adsorption, regeneration and rinse. In the present process, the perchlorate and nitrate anions present in feed water are concentrated into a much smaller effluent stream. A typical process configuration involves the use of an ISEP which provides for the perchlorate present in the feed water to be adsorbed onto an ion-exchange resin resulting in a perchlorate-free treated water. In the regeneration zone of the ISEP unit, the adsorbed perchlorate is effectively removed from the ion-exchange resin using relatively low volumes of concentrated brine solution as the regenerant. The process waste from the ISEP unit is a concentrated brine solution containing perchlorate and other anions that may be present in the feed stream. The waste stream is then preferably treated by a combination of: i) a bioreactor that removes perchlorate and any nitrate anions or a catalytic reactor that reduces the perchlorate and/or nitrate present in the waste stream; ii) any sulfates present are removed by nanofiltration or other conventional methods; and iii) filters and a disinfectant system to render the brine stream re-usable.

The resulting stream is recycled back into the process. The process of the present invention results in a very small waste stream for disposal. The process can be applied to feed water streams containing either perchlorate alone or perchlorate and other anions such as nitrate, sulfate and bicarbonate. Other advantages of present invention will become apparent from a perusal of the following detailed description of a presently preferred embodiment taken in connection with the accompanying drawings.

BRIEF DESCRIPTION OF THE DRAWINGS

FIG. 2 shows multiple perchlorate adsorption profiles of a strong base polyacrylic Type I resin; and FIG. 3 shows multiple perchlorate regeneration profiles of the same resin referred to in the profiles for FIG. 2.

PRESENTLY PREFERRED EMBODIMENT

Figure 1:
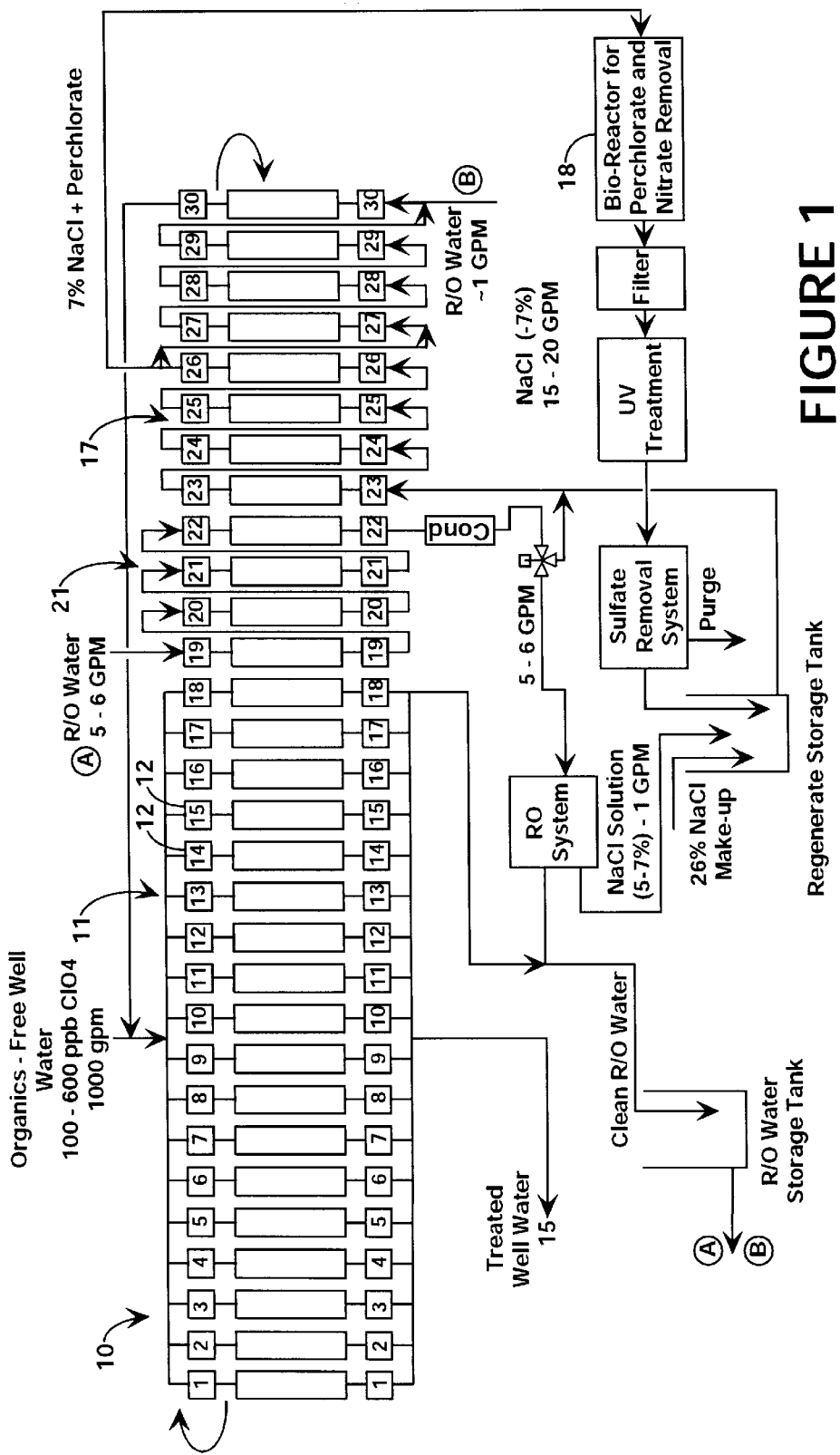
FIG. 1 is a process flow diagram showing a typical process configuration of the present invention.

Referring to FIG. 1, a complete process flow diagram is shown illustrating the operation of an ISEP 10 and associated units. In this example, a 1000 gpm feed flow is shown which contains 100–600 ppb perchlorate. The perchlorate present in the feed water is exchanged with chloride on the resin in the adsorption zone 11 in a downflow mode, i.e., from the top of the column 12 to the bottom. The water 15 thus treated from the columns in the adsorption zone can have non-detectable levels (<4 ppb) of perchlorate, thereby making the water suitable for distribution. Typically, the perchlorate range is up to about 40 ppb and, preferably, less than 18 ppb. The resin containing adsorbed perchlorate is treated in the regeneration zone 17 using a brine solution that exchanges the perchlorate ions on the resin with the chloride ions from brine. Preferably, the brine or regenerant is in a concentration of from 0.001 to about 30 weight percent and is selected from the group consisting of sodium chloride, sodium sulfate, sodium bromide, sodium nitrate, potassium chloride, potassium sulfate, potassium bromide, potassium nitrate.

In a preferred embodiment of the invention, the regeneration stream is pumped upflow, i.e., from the bottom of the column to the top. The spent brine effluent from the regeneration zone, contains the perchlorate anions in a significantly higher concentration than the feed. The effluent contaminated brine stream flow rate is typically less than or equal to about 2% of the total feed water stream. Thus, for a 2000 gpm feed water stream, the spent brine effluent is expected to be 40 gpm or less.

The spent brine effluent is then sent to reactor 18 containing a suitable microbe for perchlorate and/or nitrate destruction. An example of such a microbe is a prokaryotic microorganism, whose efficiency in perchlorate destruction in the presence of other anions is shown by results in Table 1.

TABLE 1

| Feed Composition | | Nutrient Formulation | Concentration of perchlorate (ppm) at 10 minute reaction time | Perchlorate destruction* (wt %) at 10 minute reaction time |
|---|---|---|---|---|
| | ppm | Code | | |
| NaCl | 70,000 | NF1 | 31.9 | 16.3 |
| | | NF2 | 35.8 | 6.0 |
| $ClO_4^-$ | 50 | NF3 | 31.4 | 17.6 |
| $NO_3^-$ | 800 | NF4 | 31.4 | 17.6 |
| $SO_4^{2-}$ | 2800 | NF5 | 33.6 | 11.8 |
| $HCO_3^-$ | 200 | NF6 | 34.7 | 8.9 |
| | | NF7 | 30.2 | 20.7 |
| $F^-$ | 0.5 | NF8 | 31.4 | 3.4 |
| | | NF9 | 31.4 | 3.4 |

*Corrected for nitrate interference, contributed by nitrate in the reaction mixture and possibly, in the nutrient formulations.

The microbe can operate in an anoxic or anaerobic environment that facilitates the use of perchlorate for cellular metabolism. The residence time for substantial perchlorate destruction using such a microbe and a favorable nutrient formulation is on the order of about 20 minutes. Thus, for a 2000 gpm feed water stream resulting in a brine effluent stream of 40 gpm or less, the reactor size for treating the brine effluent is expected to be about 800 gallons or less. The brine after perchlorate (and nitrate) destruction is passed through a sulfate removal unit such as a nanofiltration system that can include a solids pre-filter or post-filter. The resulting brine is passed under an ultraviolet (UV) lamp, for example, an Aurora UV manufactured by Calgon Carbon Corporation, that serves as a disinfectant to destroy any active microbes that may be present. The brine is then sent to a regenerant storage tank where adequate amounts of fresh make-up brine is added and re-used as regenerant in the process.

The rinse zone 21 serves to remove the excess brine from the columns before being sent to the next adsorption zone. The rinse wash effluent is treated by a reverse osmosis system resulting in a pure water stream used as a feed for the rinse zone and a concentrated brine stream that is pumped directly to the regenerant storage tank. Thus the adsorption, regeneration and rinse zones constitute a complete cycle and are continuously operated. The waste streams possibly resulting from the process are the small metabolic waste from the microbes and the sulfate rejection stream, the combination of which is less than or equal to about 0.2% of the total feed water flow.

It should be noted that the above process is a specific description of the process concept that is much wider in scope wherein the concentration of the influent stream into a smaller brine stream containing perchlorate and nitrate may be achieved using a fixed-bed system or a simulated moving bed (SMB) system instead of the ISEP unit. Similarly, other units of the process described above may be replaced by alternate systems performing the same function.

An important consideration in the operation of the present invention is the selection of a suitable anion-exchange resin. Desirable resin characteristics are high selectivity towards perchlorate and ease of regeneration. Since these are often opposing characteristics, an optimal resin is one that best utilizes the operating advantages of the ISEP, the fixed bed or the SMB systems, bearing in mind that the optimal resin for each of the systems need not be the same.

As an example for the process configuration shown in FIG. 1, a commercially-available strong base polyacrylic Type I resin is suitable. Type II and Type III resins are also useful. Type I resin, however, was chosen from among various alternatives based on conducting batch isotherm tests and continuous column tests. An example of the batch isotherm data measuring the dissolved perchlorate concentration as a function of time for various chloride-form anion exchange resins is shown in Table 2.

TABLE 2

| | Perchlorate concentration (ppm) at time * | |
|---|---|---|
| Resin type | 0.333 hours | 24 hours |
| Strong base Type I polystyrene-based | 35 | 16 |
| Strong base Type I polyacrylic-based | 224 | 323 |
| Nitrate-selective | 21 | 5 |
| Weak base polyacrylic-based | 464 | 464 |
| Weak base polystyrene-based | 336 | 243 |
| Strong base Type II polystyrene-based | 55 | 31 |
| Strong base Type III | 50 | 36.4 |

* Perchlorate concentration at time = 0 hours was approximately 600 ppm

An example of the continuous column test data obtained from the multiple adsorption (load) and regeneration (strip) cycles for a strong base polyacrylic Type I resin is shown in FIGS. 2 and 3, respectively. This result obtained from this resin is intended to serve only as an example of typical adsorption and regeneration profiles. The overall process is, understandably, wider in scope extending to all anion-exchange resins. The composition of the feed water used in obtaining the results in FIGS. 2 and 3 is provided in Table 3. The abscissa in these figures is resin bed volumes (BV's), a unit of measure that makes the adsorption and regeneration curves valid regardless of the actual resin volume used.

TABLE 3

| Anion | Anion Concentration (ppm) |
|---|---|
| Perchlorate (as $NaClO_4$) | 5.0 |
| Nitrate (as $Mg(NO_3)_2$ and $KNO_3$) | 19.3 |
| Sulfate (as $K_2SO_4$ and $MgSO_4$) | 41.9 |
| Bicarbonate (as $NaHCO_3$) | 170 |
| Fluoride (as NaF and CaF) | 0.29 |
| Chloride ($MgCl_2$) | 42.1 |

FIG. 2 represents the adsorption curve of the resin using a simulated ground water stream containing perchlorate and other anions at concentration levels given in Table 3. FIG. 3 shows the regeneration curve of the resin using a brine stream, which is a water stream containing 7 wt % of dissolved Sodium Chloride (NaCl). As shown in FIG. 3, twelve BV's of this brine stream were found sufficient in achieving a near-complete regeneration of the resin. This is indicated by the adsorption data in FIG. 2 where the breakthrough profiles of perchlorate for the second cycle and beyond are similar to the first adsorption cycle using fresh resin. Similar results have been obtained using feed water perchlorate concentration of 100 ppb with the rest of the anions at concentrations given in Table 3. The ratio of adsorption BV's to regeneration BV's for steady-state operation impacts the ISEP design parameters, such as numbers of columns in adsorption vs. regeneration zone and process flow rates. The column testing thus serves as a design basis for configuring the ISEP unit as shown in FIG. 1.

The presently preferred embodiment of the invention was successfully demonstrated in a pilot scale using 4.28 GPM of a contaminated ground water. This contaminated water stream is being successfully treated to produce a drinking water stream that exceeds the specifications for perchlorate and nitrate levels. Some of the results from the pilot test are included in Table 4.

TABLE 4

| Feed water | TIME (hours) | TREATED WATER | |
|---|---|---|---|
| | | $ClO_4^-$ (ppb) | $NO_3^-$ (ppm) |
| $ClO_4^-$: 58 ppb | 12 | <4 | <1 |
| $NO_3^-$: 28 ppm | 25 | <4 | <1 |
| | 65 | <4 | 11 |
| | 73 | <4 | 13 |
| | 81 | <4 | 9 |
| | 89 | <4 | 12 |
| | 96 | <4 | 11 |

While a presently preferred embodiment of the invention has been shown and described in particularity, it may be otherwise embodied within the scope of the appended claims.

What is claimed is:

1. A process for the removal and destruction of perchlorate and nitrate anions from feed water to provide treated water, said process comprising:
    a. concentrating any perchlorate and nitrate anions by adsorption of said anions on an ion exchange resin;
    b. removing any of said perchlorate from said exchange resin with a regenerant to create an effluent stream;
    c. feeding said effluent stream into a bioreactor with one or more microbes or a catalytic reactor for destroying any perchlorate and any nitrate present in said effluent stream and thereafter feeding said effluent stream into a sulfate removal system for removing any sulfate anions present in said effluent stream to provide a treated effluent stream; and
    d. thereafter filtrating said treated effluent stream to filter any fine solids that may be present and thereafter purify said stream by reverse osmosis.

2. The process according to claim 1 wherein the treated water has a perchlorate concentration of 0–40 ppb.

3. The process according to claim 2 wherein the treated water has a nitrate concentration up to about 160 ppm.

4. The process according to claim 3 wherein the feed water is a ground water, process feed water, process waste water or any other water source containing perchlorate and/or nitrate.

5. The process according to claim 4 wherein the feed water contains one or more anions selected from the group consisting of perchlorate from 0 to 1000 ppm, nitrate from 0 to 1000 ppm, sulfate from 0 to 1000 ppm, and any amounts of bicarbonate, chloride and fluoride.

6. The process according to claim 5 wherein said separation is carried out in one of an ISEP unit, a single or multiple fixed-bed system or a simulated moving bed (SMB) system or combination thereof.

7. The process according to claim 6 wherein said regenerant is selected from the group consisting of sodium chloride, sodium sulfate, sodium bromide, sodium nitrate, potassium chloride, potassium sulfate, potassium bromide and potassium nitrate.

8. The process according to claim 7 wherein said regenerant has a concentration range from about 0.001 to 30 wt %.

9. The process according to claim 8 wherein said regenerant is a water stream containing 0.001 to 30 wt % dissolved sodium chloride.

10. The process according to claim 9 wherein said bioreactor contains one or more anoxic or anaerobic microbes that convert perchlorate and nitrate to chloride and nitrogen, respectively, either in the presence or absence of other dissolved anions.

11. The process according to claim 10 wherein said sulfate removal is by nanofiltration.

12. The process according to claim 1 wherein ultraviolet (UV) light or ozonation is used as a disinfectant.

13. The process according to claim 1 wherein said ion-exchange resin is selected from Type I, Type II and Type III resins.

14. The process according to claim 1 wherein said feed water is first fed through a granular activated carbon, a zeolite, an ultraviolet oxidation or any combination thereof.

* * * * *